United States Patent Office 3,532,732
Patented Oct. 6, 1970

1

3,532,732
PROCESS OF PREPARING POLYALKYLENE-
POLYSILOXANE BLOCK COPOLYMERS
Gerd Rossmy, Essen-Werden, Götz Koerner, Mulheim
(Ruhr), and Jakob Wassermeyer, Duesseldorf, Germany, assignors to Th. Goldschmidt A.-G., Essen,
Germany
No Drawing. Continuation-in-part of application Ser. No.
519,948, Jan. 11, 1966. This application Mar. 12, 1969,
Ser. No. 806,683
Claims priority, application Germany, Feb. 1, 1965,
G 42,718
The portion of the term of the patent subsequent
to Dec. 24, 1980, has been disclaimed
Int. Cl. C07f 7/02
U.S. Cl. 260—448.2
16 Claims

ABSTRACT OF THE DISCLOSURE

Process of preparing polyalkyleneoxidepolysiloxane block copolymers by the reaction of chloropolysiloxanylsulfates with polyalkyleneoxide derivatives.

Chloropolysiloxanylsulfates of the average structural formula

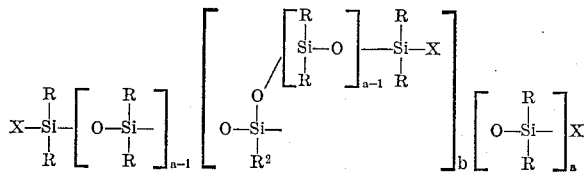

wherein

R is lower alkyl or phenyl;
$R^1$ is lower alkyl, vinyl or phenyl;
X is chlorine, wherein a portion of the chlorine atoms are replaced by $SO_4/2$;
$a$ has a value of from 3–10; and
$b$ has a value of from 1–14 are reacted with mixtures of alkyleneoxide addition products consisting of about 50–95 OH-equivalent percents of (a) polyalkyleneglycolmonoethers essentially consisting of ethyleneoxide and propyleneoxide units and having a content of 40–70% by weight of oxypropylene units and having a mole weight of 1000–3000 and about 5–50 OH-equivalent percents of (b) alkyleneoxide addition products with multivalent hydroxyl compounds of a molecular weight of about 130–3500, whose polyalkyleneglycol component consists of ethyleneoxide and/or propyleneoxide units and which have an OH-equivalent weight up to 1750.

CROSS-REFERENCE TO PRIOR APPLICATIONS

This is a continuation-in-part of our copending application Ser. No. 519,948, filed Jan. 11, 1966, now abandoned.

SUMMARY OF THE INVENTION

This invention generally relates to organosilicon compounds and is particularly directed to novel polyalkyleneoxide-polysiloxane block copolymers and to a process for making such polymers.

In the production of polyurethane foams, certain surface active substances are customarily added to the charge to be foamed. These surface active substances (hereinafter referred to as foam stabilizers) render possible the formation of a uniform pore structure and stabilize the formed foam until the termination of the reaction. Polyalkyleneoxide-polysiloxane block copolymers have been found to be particularly suitable for the indicated purpose.

Various processes have previously been suggested for the preparation of such mixed or copolymers of the block type. U.S. Pats. 2,917,480 and 2,834,748 thus disclose processes for the production of block copolymers of the indicated kind. However, only very few of the block copolymers of these U.S. patents can be successfully employed as foam stabilizers. This is so because the surface activity of these compounds, although being a necessary criterion, is not sufficient to make such compounds suitable as foam stabilizers. In order to be capable of effectively fulfilling the requirements for a satisfactory foam stabilizer, the polyalkyleneoxide moiety of the block copolymer has to be present in a balanced weight ratio to the polysiloxane moiety. Furthermore, the composition of the two blocks or block moieties forming the total block copolymer is of great significance for the foam stabilizing characteristics of the compound.

In respect to the polyalkyleneoxide block, the ratio of ethylene oxide to propylene oxide in the preparation of this block is of particular importance in respect to the foam stabilizing characteristics. On the other hand, in regard to the polysiloxane block, several factors are capable of significantly influencing the characteristics of the entire block copolymer. Thus, for example, the nature of the hydrocarbon groups which are linked to the silicon atom, the average molecular weight of the polysiloxane block, its molecular weight distribution and the extent to which the block is branched, are all factors which may influence the final properties of the copolymer.

A further and more recent mode of preparing such polyalkyleneoxide-polysiloxane block mixed or copolymers of different structure has been disclosed in U.S. Pat. 3,115,512. Pursuant to the process as disclosed in U.S. Pats. 2,917,480 and 2,834,748, previously referred to, ethoxysiloxanes are reesterified with polyalkyleneglycols or their monoethers. By contrast, the block copolymers of U.S. Pat. 3,115,512 are prepared by reacting a mixture of di- and trifunctional chlorosilanes with amounts of water and sulfuric acid which are insufficient to accomplish complete hydrolysis, whereafter the chloropolysiloxanylsulfates—which at least approximately are in a state of statistical distribution—are reacted with polyalkyleneglycols or their monoethers. This esterification reaction proceeds in the presence of an acid acceptor in an irreversible and surprising manner since, according to the state of the art, it should have been expected that the sulfuric acid of the chloropolysiloxanylsulfates would intercept the glycols with resulting esterification.

The process of the present invention is predicated on the process as disclosed in U.S. Pat. 3,115,512 and is an important modification and improvement thereof. The inventive procedure is based on the surprising realization that reaction products are obtained which have superior and unexpected characteristics as polyurethane foam stabilizers if particular chloropolysiloxanylsulfates on the one hand and certain mixtures of polyalkyleneoxide derivatives on the other hand are carefully selected. The block copolymers obtained in the inventive manner exert their full foam stabilizing activity already at significantly lower concentrations in the charge to be foamed than the known prior art foam stabilizers of the indicated kind. Furthermore, the inventive products, obtained in accordance with the inventive process, are less susceptible and sensitive to unfavorable foaming conditions, so that the foaming can be carried out under less stringently controlled conditions than are usually required in foaming polyurethanes. Employment of the inventive compounds results in the production of foams of extremely fine and uniform cellular structure and the quality of the foam is not affected by widely varying the speed of the agitating means provided in the mixing head. This means that fluctuations in the number of revolutions of the mixer do not affect the cellular structure of the foam to be obtained which, of course, is a great advantage from an operational point of view. Generally, the inventive foam stabilizers are capable of influencing the cell structure of the foam in such a manner that essentially so-called "open cells" are formed if soft foam is to be produced, while so-called "closed cells" are formed in the production of hard or rigid foam.

Accordingly, it is a primary object of this invention to provide a process for preparing improved polyurethane foam stabilizers of the block copolymer type.

Another object of the invention is to provide novel polyurethane foam stabilizers of the block polymer type which are superior to known stabilizers of this kind.

Generally, it is an object of this invention to improve on the art of foam stabilizers as presently practiced.

Briefly, and in accordance with this invention, the preparation of the inventive block copolymers of the indicated nature is effected by reacting (a) chloropolysiloxanylsulfates of the average structural Formula I

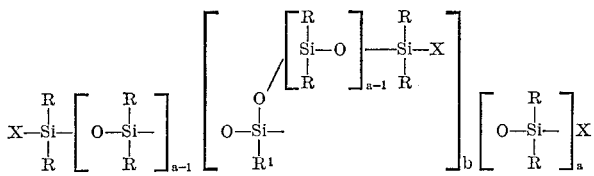

wherein
R is lower alkyl or phenyl;
$R^1$ is lower alkyl, vinyl or phenyl;
X is chlorine, wherein a portion of the chlorine atoms are replaced by $SO_4/2$;
$a$ has a value of between 3 and 10; and
$b$ has a value of between 1 and 14 with (b) mixtures of polyalkyleneglycol - monoalkyl(aryl) ethers and poly)-alkyleneoxide addition products with multivalent organic hydroxyl compounds which are composed of 50–95 OH-equivalent percents of ($b^1$) polyalkyleneglycolmonoethers, consisting of ethyleneoxide and propyleneoxide units and having a content of 40–70 percent by weight of oxypropylene units and a mole weight of 1000 to 3000, whose hydroxyl group is preferably secondary, and 5–50 OH-equivalent percents of ($b^2$) alkyleneoxide addition products with multivalent organic hydroxyl compounds of a molecular weight of 130–3500, whose polyalkyleneglycol component consists of ethylene oxide and/or propylene oxide units and which have an OH-equivalent weight up to 1750 and whose hydroxyl group is preferably secondary.

Reactants (a) and (b) are reacted in a manner known per se in quantity relations so that one acid equivalent of the chloropolysiloxanyl sulfate corresponds to at the most 1.4, but preferably 1.05 to 1.2 OH-equivalents.

As seen from Formula I, the chloropolysiloxanylsulfates are branched. R, as indicated, is generally lower alkyl or phenyl. Methyl, ethyl and propyl are thus suitable lower alkyl groups for the inventive purpose. Within the polymer molecule, the individual R groups may be of different nature. In such event, preferably 90% of all R groups are then methyl groups.

$R^1$ is lower alkyl, such as methyl or ethyl, vinyl or phenyl.

The preferred range for integer $a$ is 4–8, while the preferred range for $b$ is 1–8. The values for $a$ and $b$ are preferably chosen so that the ratio $R:R^1$ is between 10 and 60. The preferred content of silicon in the polymer mixture amounts to 6–10% by weight.

Contingent on the manner of preparation, the chloropolysiloxanylsulfates are, in respect to their polymer distribution, at least approximately in a statistical equilibrium. Such a system is also designated as an equilibrated system. It will be appreciated by those skilled in this specialized art, that block copolymers produced from an equilibrated chloropolysiloxanylsulfate are largely uniform in respect to their characteristics and properties. This of course means that the polymer mixtures formed in accordance with the invention can be prepared in a readily reproduceable manner so that the uniformity of the individual batches is excellent.

In a preferred embodiment, 10–30% of all X groups in the chloropolysiloxanylsulfates constitute an equivalent of the sulfate group.

In respect to the polyalkyleneglycol mixtures or the mixtures of their derivatives which, in accordance with the invention, are reacted with the chloropolysiloxanylsulfates, the hydroxyl groups are predominantly present in secondary form. This may, for example, be achieved thereby that in the preparation of the polyalkyleneglycols or their derivatives from ethylene oxide and propylene oxide, the reaction is terminated with an addition of propylene oxide.

One of the components of the mixture of alkylene oxide derivatives consists of polyalkylene glycol monoether which has a molecular weight of 1000–3000. The molecular weight is preferably within a range of 1500–1900. The polymer chain is end blocked at one end by an alkyl or aryl group. The alkyl group is preferably a lower alkyl up to 6 carbon atoms. If the end blocking group is aryl, phenyl is the preferred choice. Such polyalkyleneglycolmonoethers may be represent by the general formula

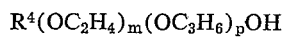

In this formula, $R^4$ is alkyl or aryl as indicated above.

The values for $p$ and $m$ are determined by two conditions, to wit:

(1) The amount of propyleneoxide units should be 40–70% by weight; and (2) The molecular weight should be between 1000 to 3000.

Within the molecule, the oxyethylene and oxypropylene units may occur in an alternating sequence or in a sequence which is determined by statistical distribution. However, it is also feasible that a block built up from oxypropylene units may follow a block built from oxyethylene groups.

The other component of the mixture of alkylene oxide derivatives, to wit, 5–50, preferably 7.5–30 OH-equivalent percents, constitute alkylene oxide addition products of multivalent organic hydroxyl compounds. Also in this instance, the polyalkylene oxide component is again built up from oxyethylene and oxypropylene units, the oxypropylene units amounting preferably to about 50–70% by weight of this component. However, compounds which contain 100% by weight of oxypropylene as oxyalkylene units are also suitable for the inventive purposes.

The molecular weight of the alkylene oxide addition products of multivalent organic hydroxyl compounds amounts to 130–3500. However, it preferably should be within a range of 1000–2500. Examples of such compounds are addition products of ethyleneoxide and/or propyleneoxide with ethyleneglycol, propyleneglycol, glycerine, pentaerithrite and sorbit. Preferred compounds are the diols of the general formula $$HO(C_3H_6O)_q(C_2H_4O)_r(C_3H_6O)_sH$$

The preferred numerical values for the indices $q$, $r$ and $s$ are the corollary of the previously mentioned conditions in respect to the mole weight and content of oxypropylene units. It thus follows that $r$ may assume the value of 0. Examples of such compounds are dipropyleneglycol as well as its addition products with propyleneoxide.

The invention will now be described by examples and comparison tests, it being understood, however, that these examples are given by way of illustration and not by way of limitation and that many changes may be effected without affecting in any way the scope and spirit of this invention as recited in the appended claims.

EXAMPLES

(a) Foaming charge $a_1$

The foaming charge was made up from:

400 g. of an addition product of propyleneoxide with glycerine having an OH-number of 55,
1.28 g. of Sn-octoate,
16 g. of water,
0.4 g. of triethylenediamine,
1.6 g. (or 1.2 g. or 1.0 g., as will appear more clearly from Table 2 hereafter) of a polyalkylene oxide-polysiloxane block copolymer produced in accordance with the invention,
200 g. of toluylenediisocyanate (ratio of the isomers 2,4:2,6 compound=80:20), and
8 g. of trichlorofluoromethane.

Foaming charge $a_2$

The foaming charge was made up from:

400 g. of an addition product of propyleneoxide with glycerine having an OH-number of 55,
0.8 g. of Sn-octoate,
18.4 g. of water,
0.204 g. of triethylenediamine,
1.6 g. of a polyalkyleneoxide-polysiloxane block copolymer produced in accordance with the invention, and
222.4 g. of a toluylenediisocyanate (ratio of the isomers 2,4:2,6=80:20).

(b) Foaming procedure and conditions

The addition product of propyleneoxide with glycerine is well mixed under agitation with the tin octoate. The solution of triethylenediamine and polyalkyleneoxidepolysiloxane block polymer in water is added under additional effective stirring. This mixture is then admixed with the trichlorofluoromethane and subsequently with the toluylenediisocyanate. In respect to foaming charge $a_2$, the toluylenediisocyanate is immediately added. The reaction mixture is then well mixed for 7 seconds with a mixing speed of 3500 r.p.m. or with the speed indicated in Table 2 below. The mixing is accomplished by means of a flat disk having a diameter of about 5 cm. and provided with cup-shaped depressions. The mass foams in a glassy-like manner and is poured into a carton having a base surface of 28 x 28 cm. The rising time of the foam and the height of the foam piece obtained after solidification as well as the height difference about which the foam retracts up to the solidification or hardening are measured.

(c) Preparation of the polyalkyleneoxide-polysiloxane block copolymers (ASP)

$p$ Gram of polyalkyleneglycolmonoether A and $q$ gram of polyalkyleneglycolpolyoles $B_1$, $B_2$, $B_3$ or $B_4$ are dissolved in $r$ cc. of toluene. (The letter values refer to the values given in Tables 1 and 2.) $s$ cc. of toluene are removed by distillation for drying the reaction mixture. $t$ Gram of chloropolysiloxanylsulfate $C_1$, $C_2$, $C_3$ or $C_4$, respectively, are added to the dried solution and the mixture thus obtained is stirred. Ammonia is introduced into the system at a temperature of about 70° C. until ammoniacal reaction is observed. The solvent is subsequently removed by distillation at the same temperature and under slight vacuum conditions. The remaining solvent residues are removed at a pressure of 10–12 mm. Hg. The product is liberated from precipitating salts by filtration.

The compounds subjected to the reaction have the following composition:

Polyalkyleneglycolmonoether A.—This is an addition product of ethyleneoxide and propyleneoxide in block form with butanol, the last block being a propyleneoxide block. The addition reaction is performed in step-wise manner with 3 moles of alkyleneoxide in each step. The weight ratio propyleneoxide to ethyleneoxide=58:42; the OH-number=31.5.

Alkyleneoxide addition product with multivalent organic hydroxyl compound $B_1$.—This is an addition product of ethyleneoxide and propyleneoxide in block form with dipropyleneglycol, as described hereinabove. Ratio of propyleneoxide to ethyleneoxide=58:42; OH-number =35.

Addition product of alkyleneoxide with multivalent organic hydroxyl compounds $B_2$.—The same as referred to under $B_1$. OH-number=69.

Alkyleneoxide addition product $B_3$.—Dipropyleneglycol. OH-number=239.

Alkyleneoxide addition product $B_4$.—Addition product of propyleneoxide and ethyleneoxide with glycerine in block form, the last block being a propyleneoxide block. Weight ratio propyleneoxide to ethyleneoxide 58:42; OH-number=54.

Chloropolysiloxanylsulfate $C_1$.—The compound corresponds to Formula I, wherein the subscripts have the following values:

$a=6.17$
$b=3$
$R=R^1=CH_3$

Chloropolysiloxyanylsulfate $C_2$.—The compound corresponds to Formula I, wherein the subscripts have the following values:

$a=5.45$
$b=10$
$R=R^1=CH_3$

Chloropolysiloxanylsulfate $C_3$.—The compound corresponds to Formula I, wherein the subscripts have the following values:

$a=6$
$b=1$
$R=CH_3$
$R^1=C_6H_5$

Chloropolysiloxanylsulfate $C_4$.—The compound corresponds to Formula I, wherein the subscripts have the following values:

$a=3$
$b=1$
$R=CH_3$
$R^1=-CH=CH_2$

In compounds $C_1$–$C_4$, the sulfate content amounts in each case to 0.0166 mole $SO_4$ per Si atom.

Nine polyalkyleneoxide-polysiloxane block copolymers (ASP I–IX) were produced. The composition of the individual charges obtained according to the foaming procedure described hereinabove are represented in Table 1 below.

TABLE I

| Polyalkyleneglycolpolysiloxane block co-polymer | Polyalkyleneglycol monoether A, $p$ gram | Polyalkyleneglycolpolyol Kind | Amount, $q$ gram | Toluene, $r$ cc. | Toluene, $s$ cc. | Chloropolysiloxanylsulfate Kind | Amount, $t$ gram | Viscosity of reaction product |
|---|---|---|---|---|---|---|---|---|
| ASP I | 200 | $B_2$ | 15.4 | 720 | 150 | $C_1$ | 69.5 | 1,450 |
| ASP II | 150 | $B_1$ | 31.4 | 570 | 100 | $C_1$ | 54 | 2,120 |
| ASP III | 150 | $B_4$ | 20.3 | 550 | 100 | $C_1$ | 54 | 1,595 |
| ASP IV | 200 | $B_3$ | 3.14 | 580 | | $C_1$ | 84.8 | 1,366 |
| ASP V | 150 | $B_2$ | 27.3 | 600 | 100 | $C_1$ | 60.7 | 1,834 |
| ASP VI | 200 | $B_2$ | 22.3 | 700 | 100 | $C_1$ | 74.2 | 1,615 |
| ASP VII | 246 | $B_2$ | 5.75 | 590 | 100 | $C_2$ | 70 | 1,925 |
| ASP VIII | 248 | $B_2$ | 18.3 | 600 | 100 | $C_3$ | 75 | 1,487 |
| ASP IX | 351 | $B_2$ | 51.8 | 1,200 | 200 | $C_4$ | 60 | 1,263 |

(d) Performance of the comparison tests

The comparison tests were carried out with the foam stabilizers produced according to (c) corresponding to the foaming charges indicated under (a) under the foaming conditions indicated under (b). As comparison substance, a polyalkyleneoxide-polysiloxane block copolymer was used which was prepared from a chloropolysiloxanyl sulfate corresponding to Formula I by reaction with the polyether A. In the chloropolysiloxanylsulfate of Formula I, the symbols had the following meaning:

$$a = 5.6$$
$$b = 1$$
$$R = R^1 = CH_3$$

The preparation was effected pursuant to the conditions (c) above.

215 g. of polyether A were dissolved in 700 cc. toluene. 150 cc. of toluene were then removed by distillation in order to dry the reaction mixture. 59.5 g. of chloropolysiloxanylsulfate were added to the dry solution and the reaction mixture thus obtained was stirred. Ammonia was introduced into the system at a temperature of about 70° C. until ammoniacal reaction could be observed. The solvent was subsequently removed by distillation. This was done at the same temperature and under a slight vacuum. The last solvent traces were removed under a vacuum of 10–12 mm. Hg. The product was separated from the precipitated salts by filtration.

The viscosity of the final product was 1210 cp. This control or comparison product thus differs from the products to be used in accordance with the invention in that the chloropolysiloxanylsulfate (C) has not been reacted with the inventive mixture of polyalkyleneglycolmonoether (A) and alkyleneoxide addition products of multivalent hydroxyl compounds (B), but merely with the polyalkyleneglycolmonoether (A).

siloxane block copolymers by the reaction of chloropolysiloxanylsulfates with polyalkeneoxide derivatives, the improvement which comprises that (a) chloropolysiloxanylsulfates of the average structural formula

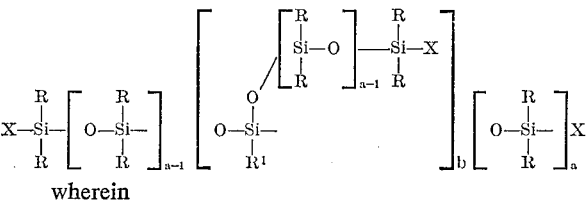

wherein

R is lower alkyl or phenyl,
$R^1$ is lower alkyl, vinyl or phenyl,
X is chlorine, wherein a portion of the chlorine atoms are replaced by $SO_4/2$,
$a$ has a value of from 3–10 and
$b$ has a value of from 1–14 are reacted with (b) mixtures of alkyleneoxide addition products consisting of about 50–95 OH-equivalent percents of ($b^1$) polyalkyleneglycolmonoethers essentially consisting of ethyleneoxide and propyleneoxide units and having a content of 40–70% by weight of oxypropylene units and having a mole weight of 1000–3000 and about 5–50 OH-equivalent percents of ($b^2$) alkyleneoxide addition products with multivalent hydroxyl compounds of a molecular weight of about 130–3500, whose polyalkyleneglycol component consists of ethyleneoxide and/or propyleneoxide units and which have an OH-equivalent weight up to 1750, said reagents (a) and (b) being reacted in quantities so that one acid equivalent of the chloropolysiloxanylsulfate corresponds to at the most 1.4 OH-equivalents.

2. The improvement of claim 1, wherein the hydroxyl

TABLE 2

| Foam stabilizer | Foaming charge | Amount of foam stabilizer in grams | Agitation speed in r.p.m. | Rising time in seconds | Retracting height in cm. | Final height in cm. | Foam characteristic |
|---|---|---|---|---|---|---|---|
| ASP I | $a_1$ | 1.0 | 3,500 | 68 | 1.5 | 20.2 | Slightly coarse. |
| Comparison substance | $a_1$ | 1.0 | 3,500 | 68 | 2.0 | 19.5 | Coarse. |
| ASP I | $a_1$ | 1.2 | 3,500 | 63 | 0.5 | 23.2 | Slightly coarse. |
| Comparison substance | $a_1$ | 1.2 | 3,500 | 60 | 0.5 | 22 | Coarse. |
| ASP I | $a_1$ | 1.6 | 3,500 | 65 | 0.5 | 24.6 | Fine. |
| ASP I | $a_1$ | 1.6 | 6,500 | 70 | 0.5 | 24.5 | Do. |
| Comparison substance | $a_1$ | 1.6 | 3,500 | 62 | 0.5 | 23 | Coarse. |
| Comparison substance | $a_1$ | 1.6 | 6,500 | 59 | 3.5 | 20.5 | Fine. |
| ASP II | $a_1$ | 1.6 | 3,500 | 54 | 0 | 26.8 | Do. |
| ASP III | $a_1$ | 1.6 | 3,500 | 56 | 0 | 25.5 | Do. |
| ASP IV | $a_2$ | 1.6 | 3,500 | 72 | 1.0 | 24.0 | Slightly coarse. |
| ASP V | $a_1$ | 1.6 | 3,500 | 70 | 1.0 | 23.5 | Fine. |
| ASP VI | $a_1$ | 1.6 | 3,500 | 75 | 1.0 | 24.0 | Do. |

What is claimed is:

1. In a process of preparing polyalkyleneoxide-polygroup of ($b^1$) and ($b^2$) is a secondary hydroxyl group.

3. A process as claimed in claim 1, wherein one acid equivalent of the chloropolysiloxanyl-sulfate corresponds to at the most 1.05–1.2 OH-equivalents.

4. The improvement as claimed in claim 1, wherein R is methyl.

5. The improvement as claimed in claim 1, wherein at least 90% of all R groups are methyl.

6. The improvement as claimed in claim 1, wherein $R^1$ is methyl or ethyl.

7. The improvement as claimed in claim 1, wherein $a$ has a value of between 4–8.

8. The improvement as claimed in claim 1, wherein $b$ has a value of between 1–10.

9. The improvement as claimed in claim 1, wherein the ratio of $R:R^1$ is equal to 10–60 and the silicon content of the block copolymer amounts to 6–10% by weight.

10. The improvement as claimed in claim 1, wherein the polyalkyleneglycolmonoethers have a molecular weight of about between 1500–1900.

11. The improvement as claimed in claim 1, wherein the alkyleneoxide addition product with multivalent organic hydroxyl compounds consists of 50–70% by weight of oxypropylene units.

12. The improvement as claimed in claim 1, wherein the mixtures of alkyleneoxide addition products consist of polyalkyleneglycolmonoethers and 7.5 to 30 OH-equivalent percents of alkyleneoxide addition products with multivalent organic hydroxyl compounds.

13. The improvement as claimed in claim 1, wherein the alkyleneoxide addition product with multivalent organic hydroxyl compound is a polyalkyleneglycol having a molecular weight of between about 1000–2500.

14. A polyalkyleneoxide-polysiloxane block copolymer prepared according to the process of claim 1.

15. In a process of preparing polyalkyleneoxide-polysiloxane block copolymers by the reaction of chloropolysiloxanyl sulfates with polyalkyleneoxide derivatives, the improvement which comprises reacting (a) chloropolysiloxanylsulfate of the average structural formula

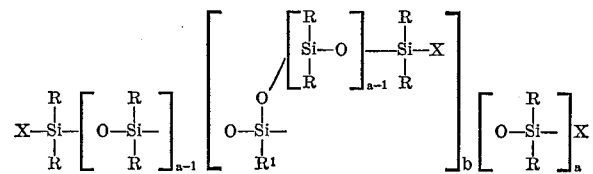

wherein
R is lower alkyl or phenyl, at least 90% of R being methyl,
$R^1$ is methyl or ethyl,
X is chlorine wherein a portion of the chlorine atoms is replaced by $SO_4/2$,
$a$ has a value of between 4 and 8, and
$b$ has a value of between 1 and 10,
the ratio of $R:R^1$ being about 10–60 with (b) mixtures of alkyleneoxide addition products which essentially consist of 70–92.5 OH-equivalent percents of ($b^1$) polyalkyleneglycolmonoethers of a molecular weight of between about 1500 and 1900 and consisting of ethyleneoxide and propyleneoxide units and having a content of 40–70% by weight of oxypropylene units whose hydroxyl group is secondary, and about 7.5–30 OH-equivalent percents of ($b^2$) alkyleneoxide addition products of multivalent hydroxyl compounds of a molecular weight of between 130–3500, whose polyalkyleneglycol component has a molecular weight of between about 1000–2500 and consists of ethyleneoxide and propyleneoxide units, about 500–70% by weight consisting of oxypropylene units, and which have an OH-equivalent weight up to 1750 and whose hydroxyl group is secondary, the reaction between reagents (a) and (b) being carried out in quantities so that one acid equivalent of the chloropolysiloxanylsulfate corresponds to between about 1.05 to 1.2 OH-equivalents, the silicon content of the block copolymer being about between 6–10% by weight.

16. A polyalkyleneoxide-polysiloxane block copolymer obtained according to the process of claim 15.

References Cited

UNITED STATES PATENTS

| | | | |
|---|---|---|---|
| 2,834,748 | 5/1958 | Bailey et al. | 260—448.2 X |
| 3,115,512 | 12/1963 | Rossmy et al. | 260—448.2 X |
| 3,183,254 | 5/1965 | Rossmy et al. | 260—448.2 |

TOBIAS E. LEVOW, Primary Examiner

W. F. W. BELLAMY, Assistant Examiner

U.S. Cl. X.R.

260—46.5